March 8, 1960 R. M. CLINEHENS 2,927,889

APPARATUS FOR MAKING MAGNETIC TAPE

Filed Jan. 22, 1957 2 Sheets-Sheet 1

INVENTORS
RICHARD M. CLINEHENS
BY Louis A Kline
Justin S Compton
HIS ATTORNEYS

INVENTORS
RICHARD M. CLINEHENS
BY Louis A. Kline
Justin S. Compton
HIS ATTORNEYS United States Patent Office 2,927,889

Patented Mar. 8, 1960

2,927,889

APPARATUS FOR MAKING MAGNETIC TAPE

Richard M. Clinehens, Dayton, Ohio, assignor to The National Cash Register Company, Dayton, Ohio, a corporation of Maryland Application January 22, 1957, Serial No. 635,416

1 Claim. (Cl. 204—216)

This invention relates to an apparatus for making a magnetic tape having superior output signal characteristics, and more particularly pertains to such a tape in which the magnetic material is in continuous form, as distinguished from tape made from particles of magnetic material applied to a supporting background tape.

The particular magnetic plating solution used in the method to be described is disclosed in United States Letters Patent No. 2,730,491, which issued on January 10, 1956, on the joint application of Walter E. Moline and this applicant. This particular plating solution and the method of its use are not to be deemed to limit the scope of the invention, as other plating solutions, which will give other magnetic characteristics, may be used. The particular plating solution to be described is one that gives a high coercive characteristic, combined with high remanence.

In one form of the invention, the magnetic tape is made without a supporting backing, and in another form of the invention the magnetic tape is given a supporting backing, such as a pressure-sensitive adhesive tape.

The apparatus includes a rotating drum which acts as the cathode of the applied electric current, the drum being treated before it enters the bath, so that the plating will not adhere firmly to it. As the plated tape on the drum leaves the bath, it is stripped off and either wound on a take-up drum or applied to pressure-sensitive tape, and the two together are wound up on a take-up drum.

The invention, in its preferred form, will be described with reference to the drawings, in which Fig. 1 is a schematic drawing of the means used for making the magnetic tape;

Figure 1:
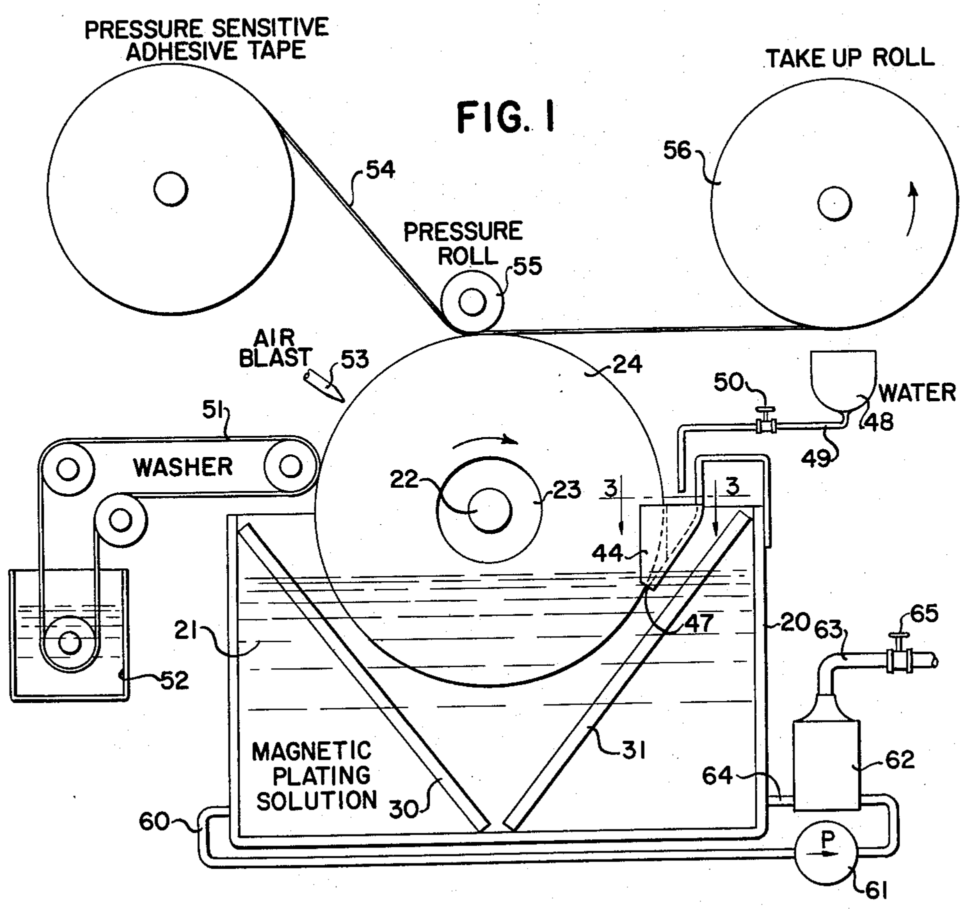

Referring to Fig. 1, there is provided a plating tank 20, filled to near the top with the plating solution 21. Supported for rotation in the tank, by an axle 22, is a drum 23, made of Phosphor bronze or nickel, which acts as the cathode of the electro-plating system. The sides and peripheral edges of the drum 23 are encased in an insulating or stop-off material 24, leaving a circumferential peripheral track 25 (Figs. 2 and 3) of exposed metal on which the tape is formed by plating.

Figure 2:
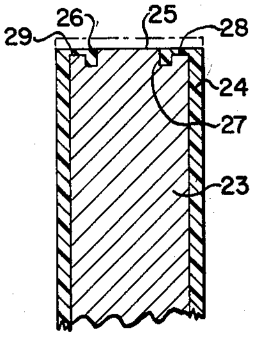
Fig. 2 is a radial section of the drum on which the tape is formed.
Figure 3:
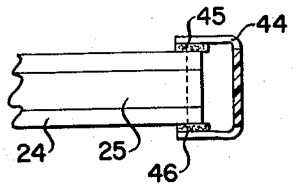
Fig. 3 is a section on the line 3—3 of Fig. 1.
Figure 4:
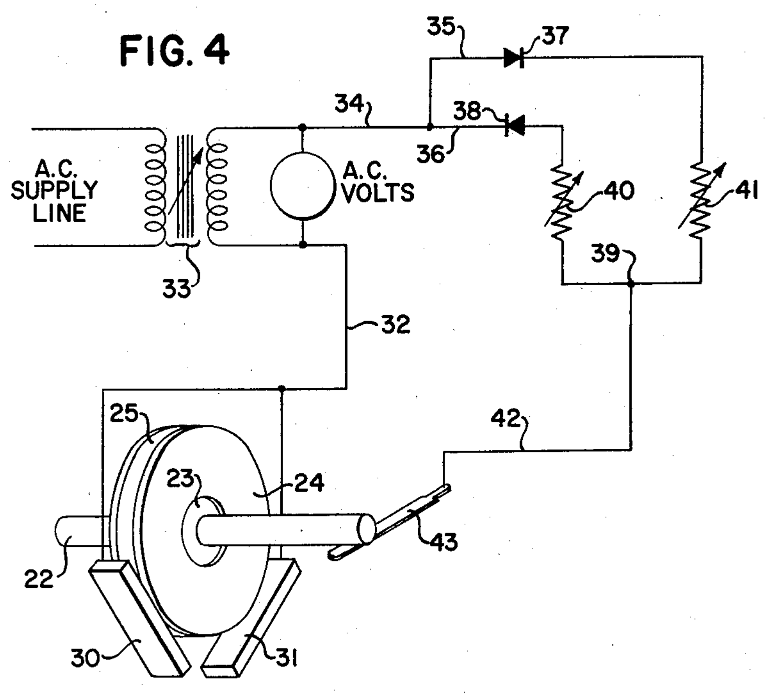
Fig. 4 is a diagram of the electric circuit used to supply electric current to plate the magnetic tape upon the drum.
Figure 5:
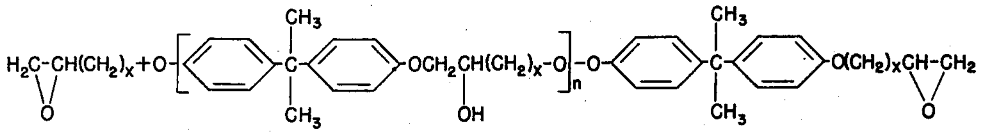

Referring to Fig. 2, the method of forming the insulating or stop-off material on the drum 23 is, first, to form the drum with peripheral grooves 26 and 27, flanked by peripheral portions 28 and 29 of less radius than the central portion 25, which is the portion to be electroplated. The portion of the drum to be immersed in the plating bath then is encased in the insulating material 24. Although any electrically-non-conductive material which is inert to the plating solution may be used as the insulating material, an epoxy resin of the general formula shown in Fig. 5 is preferred, the resin being applied in the uncured state and then cured at 325 degrees to a hardened set state. The peripheral surface of the insulated drum then is ground down until the surface 25 (Fig. 2) is reached, leaving, circumferentially and centrally on the periphery of the drum, exposed electrically-conductive material, shown at 25 in Figs. 2 and 4.

The plating current supply used is one disclosed in the United States Patent No. 2,730,491, before referred to. The circuit shown in that patent provides a plating phase and a deplating phase of equal time but of different current densities, the plating phase current being approximately 480 amperes per square foot and the deplating phase being approximately 160 amperes per square foot. At these current densities, for a plating film of .0005 of an inch, the plating time should be about seven minutes; that is to say, that portion of the drum being plated should be in the plating solution for seven minutes. If a film of .0002 of an inch is to be made, the part of the drum being plated should be in the solution for approximately 2.8 minutes.

The preferred magnetic plating solution or electrolyte is as follows in grams per liter of plating solution:

| | |
|---|---|
| Cobalt, as cobalt chloride | 25 to 75 |
| Nickel, as nickel chloride | 10 to 75 |
| Boric acid | 5 to 45 |
| Addition agents of a toluene sulfonamide taken from the group consisting of orthtoluene sulfonamide and para-toluene sulfonamide | 1 to 3 |

The plating solution described as preferred is not to be deemed to limit the invention, as other magnetic plating solutions may be used according to the characteristics desired in the finished magnetic tape. The anodes 30 and 31 are placed in the tank opposite the peripheral surface 25 and connected to the electric circuit, as shown in Fig. 4, by a conductor 32, which is connected to one terminal of the output side of an alternating current transformer 33, the other terminal of which is connected to conductor 34 to a branched circuit comprising branches 35 and 36. The branch circuit 35 has a rectifier 37, oriented in one direction, and the branch 36 has a rectifier 38, oriented in the other direction, so that the point 39 receives one half of the alternating cycle through a variable resistor 40, and the other half of the alternating cycle through a variable resistor 41, the resistors being so adjusted as to supply the current density, as before specified. The point 39 is connected by a conductor 42 to a wiper blade 43 in contact with the axle 22, which supplies the drum 23 with the necessary plating and deplating current.

Referring to Fig. 1, one of the most important aspects of the invention is the provision of means for forming a release film on the surface 25. To this end, there is provided a boot 44, opening upwardly and grasping the insulation 24 on the sides of the drum near the peripheral edge by cushions 45 and 46 (Fig. 3), leaving an opening 47 (Fig. 1) at the bottom, slightly under the level of the plating solution (Fig. 1), said opening being supplied with a capillary stopper, such as piece of felt, which allows distilled water fed into the boot to mingle somewhat with the electrolyte. The water is held in a container 48 (Fig. 1) and drips through a pipe 49, controlled by a valve 50, into the top of the boot to come out the bottom into the plating solution in a slow capillary action. The first deposit of plating on the surface 25 of the drum, because of such water-diluted electrolyte, will be an oxide of cobalt and nickel, whereas, as the drum proceeds farther in the direction of the arrow, the portion 25 of the drum will come into the full-strength electrolyte and start to be electro-plated with unoxidized nickel cobalt over the oxide. The plated surface 25, as it emerges from the magnetic plating solution, passes a washing station, at which a band of water-wet material 51 scrubs the electrolyte from the plating, said band 51 passing over rollers and being washed clean in a tank of water 52. An air blast 53 may be provided for removing the water from the tape. Inasmuch as the oxide coating is not very adhesive, the cobalt nickel plating may at this point be stripped from the track 25, attached to a pressure-sensitive adhesive tape 54 by means of a pressure roller 55, and wound on a take-up roll 56. Part of the oxidized nickel cobalt remains on the track 25, and part remains on the tape. The oxide coating which remains on the tape is so thin that it cannot be seen and will not interfere with the magnetic qualities of the tape.

To keep the plating solution at full strength, there is provided a means for removing the excess water. This means consists of an outlet pipe 60, the solution being drawn through it by a pump 61 into a heated vacuum evaporating tank 62, served by a vacuum conduit 63. The electrolyte will pass back into the tank through conduit 64, the excess water being removed in the tank 62. A valve 65 is provided to regulate the amount of suction, so that the evaporation of the water will be at the proper rate. If five gallons of magnetic plating solution are in the tank 20, the process will require about two liters of water added thereto per hour.

What is claimed is:

An apparatus for forming, continuously, solid magnetic tape, including a tank for receiving an electro-chemical bath having the desired magnetic plating salts therein; a cathode-acting electrically-conductive rotatable drum supported on a horizontal axle for rotation in one direction, said drum being partly within said tank to a point where a portion of the periphery thereof would be submerged in the bath in said tank; a boot adjacent the periphery of said drum and mounted at the side of the tank where the periphery of said rotatable drum is introduced into said tank, said boot having an upwardly-opening portion at substantially the top of said tank, and having side edges and a bottom edge, said side edges having cushions adapted to contact the sides of said drum and said bottom edge having a liquid-pervious material in contact with the periphery of said drum, the construction and arrangement being such that points on the periphery of the drum first enter the boot and then the electro-chemical bath in said tank; means for dripping water into the boot while the drum is rotating, so that the periphery of the drum passes first through the water-diluted bath in the boot and then into the non-water-diluted electro-chemical bath in said tank, said non-water-diluted electro-chemical bath containing one or more anodes of the desired magnetic material; means for passing current from the anodes through the bath to the drum; and means for stripping the resulting magnetic tape from the periphery of the drum as it emerges from the bath.

References Cited in the file of this patent

UNITED STATES PATENTS

| | | |
|---|---|---|
| 2,105,440 | Miller | Jan. 11, 1938 |
| 2,133,685 | Coughlin et al. | Oct. 18, 1938 |
| 2,540,175 | Rosenqvist | Feb. 6, 1951 |
| 2,792,304 | James | May 14, 1957 |

FOREIGN PATENTS

| | | |
|---|---|---|
| 150,063 | Great Britain | Aug. 20, 1920 |